US007415557B2

(12) United States Patent
Patella

(10) Patent No.: US 7,415,557 B2
(45) Date of Patent: Aug. 19, 2008

(54) METHODS AND SYSTEM FOR PROVIDING LOW LATENCY AND SCALABLE INTERRUPT COLLECTION

(75) Inventor: James P. Patella, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 73 days.

(21) Appl. No.: 11/422,479

(22) Filed: Jun. 6, 2006

(65) Prior Publication Data

US 2007/0283067 A1    Dec. 6, 2007

(51) Int. Cl.
G06F 13/24 (2006.01)
G06F 13/26 (2006.01)
G06F 13/32 (2006.01)

(52) U.S. Cl. ........................ 710/260; 710/264; 710/268; 710/269

(58) Field of Classification Search ................ 710/120, 710/264–265, 266, 269
See application file for complete search history.

(56) References Cited

U.S. PATENT DOCUMENTS

| 3,999,165 | A | 12/1976 | Kita et al. | |
|---|---|---|---|---|
| 5,317,747 | A | 5/1994 | Mochida et al. | |
| 5,381,552 | A | 1/1995 | Dahlberg et al. | |
| 5,410,708 | A | 4/1995 | Miyamori | |
| 5,481,724 | A | 1/1996 | Heimsoth et al. | |
| 5,485,528 | A | 1/1996 | Horn et al. | |
| 5,568,649 | A | 10/1996 | MacDonald et al. | |
| 5,594,905 | A | 1/1997 | Mital | |
| 5,619,705 | A * | 4/1997 | Karnik et al. | 710/266 |
| 5,640,571 | A | 6/1997 | Hedges et al. | |
| 5,745,772 | A * | 4/1998 | Klein | 710/266 |
| 5,815,733 | A | 9/1998 | Anderson et al. | |
| 5,857,090 | A * | 1/1999 | Davis et al. | 703/25 |
| 5,987,538 | A * | 11/1999 | Tavallaei et al. | 710/48 |
| 6,055,372 | A | 4/2000 | Kardach et al. | |
| 6,078,970 | A * | 6/2000 | Nordstrom et al. | 710/19 |
| 6,081,867 | A * | 6/2000 | Cox | 710/264 |
| 6,092,143 | A | 7/2000 | Williams et al. | |
| 6,092,226 | A | 7/2000 | Kramer et al. | |
| 6,195,715 | B1 | 2/2001 | Hoge et al. | |
| 6,205,509 | B1 | 3/2001 | Platko et al. | |
| 6,253,304 | B1 * | 6/2001 | Hewitt et al. | 712/6 |
| 6,279,067 | B1 | 8/2001 | Callway et al. | |
| 6,292,866 | B1 | 9/2001 | Zaiki et al. | |

(Continued)

*Primary Examiner*—Paul R. Myers
*Assistant Examiner*—Ryan M Stiglic
(74) *Attorney, Agent, or Firm*—Black Lowe & Graham PLLC

(57) ABSTRACT

A method for processing an interrupt signal within a microprocessor based system is described. The method includes storing a received interrupt signal within an interrupt cause register of an interrupt controller, outputting an interrupt command from the interrupt controller to an interrupt collector, asserting an interrupt signal to the microprocessor from the interrupt collector, and shifting the cause value field into a cause array. The interrupt command include an identifier field, a cause register ID field, and a cause value field, and content of the cause value field is based on a content of the interrupt cause register. The interrupt signal is asserted based on receipt of the identifier field and cause register ID field by the interrupt collector, and the shifting of the cause value field into a cause array within the interrupt collector occurs while the microprocessor services the receipt of the identifier field and cause register ID field from the interrupt collector.

19 Claims, 2 Drawing Sheets

U.S. PATENT DOCUMENTS

| | | |
|---|---|---|
| 6,338,098 B2 | 1/2002 | Klein |
| 6,356,969 B1 | 3/2002 | DeKoning et al. |
| 6,356,970 B1 | 3/2002 | Killian et al. |
| 6,374,320 B1 * | 4/2002 | Klein ......................... 710/260 |
| 6,397,284 B1 * | 5/2002 | Sleeman et al. ............. 710/266 |
| 6,662,242 B2 * | 12/2003 | Holm et al. ................... 710/9 |
| 6,823,414 B2 * | 11/2004 | Radhakrishna .............. 710/262 |
| 6,883,053 B2 | 4/2005 | Shinagawa et al. |
| 6,983,339 B1 * | 1/2006 | Rabe et al. .................. 710/260 |
| 7,206,883 B2 * | 4/2007 | Ho et al. ..................... 710/260 |
| 2002/0029310 A1 * | 3/2002 | Klein ......................... 710/260 |
| 2003/0074508 A1 * | 4/2003 | Uhler ......................... 710/260 |
| 2003/0167366 A1 * | 9/2003 | Radhakrishna .............. 710/262 |
| 2004/0199694 A1 * | 10/2004 | Yiu et al. ..................... 710/264 |
| 2004/0205266 A1 | 10/2004 | Regal et al. |
| 2005/0066099 A1 * | 3/2005 | Radhakrishna .............. 710/262 |
| 2005/0114723 A1 * | 5/2005 | Ho et al. ..................... 713/323 |
| 2005/0120154 A1 * | 6/2005 | Ho et al. ..................... 710/260 |
| 2005/0144347 A1 * | 6/2005 | Kitamura et al. ............ 710/260 |
| 2006/0253635 A1 * | 11/2006 | Uhler ......................... 710/269 |
| 2007/0124569 A1 * | 5/2007 | Uhler ......................... 712/228 |
| 2007/0186023 A1 * | 8/2007 | Ho ............................. 710/266 |

* cited by examiner

METHODS AND SYSTEM FOR PROVIDING LOW LATENCY AND SCALABLE INTERRUPT COLLECTION

BACKGROUND OF THE INVENTION

This invention relates generally to processor based systems, and more particularly, to methods and systems for providing low latency and scalable interrupt collection capabilities for processor based systems.

Exception and notification based interrupt schemes for utilization within processor based architectures have been in existence since the first microprocessor systems were put into use. The term processor, as used herein, refers to microprocessors, microcontrollers, ASICS, FPGAs, RISC-based processors, programmable logic, and any other processing device that may incorporate one or more interrupt signals and associating servicing (interrupt handling) routines. Minimizing the hardware latency of interrupt signals and minimizing the software interrupt handler response time necessary to identify each interrupt source has been the topic of many technical papers and patents.

As digital microprocessor based systems increase in complexity and size, improved interrupt collection architectures are needed that provide scalability, low latency, and minimal I/O pin count. As a practical example, real time systems that are used for command and control in space based applications need predictable interrupt latency, and the ability to support a large number of interrupt sources.

BRIEF DESCRIPTION OF THE INVENTION

In one aspect, a method for processing an interrupt signal within a microprocessor based system is provided. The method includes storing a received interrupt signal within an interrupt cause register of an interrupt controller and outputting an interrupt command from the interrupt controller to an interrupt collector, the interrupt command including an identifier field, a cause register ID field, and a cause value field, a content of the cause value field based on a content of the interrupt cause register. The method further includes asserting an interrupt signal to the microprocessor from the interrupt collector, based on receipt of the identifier field and cause register ID field by the interrupt collector, and shifting the cause value field into a cause array within the interrupt collector while the microprocessor services the receipt of the identifier field and cause register ID field from the interrupt collector.

In another aspect, a system architecture for processing of interrupts is provided. The system architecture includes a microprocessor comprising at least one interrupt input pin, a bridge device configured to comprise an interrupt collector and a cause register array, the bridge device coupled to at least one interrupt pin, and at least one processing device. The at least one processing device is configured to comprise an interrupt controller module and a cause register. The interrupt controller module is serially connected to the interrupt collector and configured to receive interrupt signals, organize the signals within the cause register, and transfer contents of the cause register to the interrupt collector. The interrupt collector is configured to notify the microprocessor of an interrupt and store the received contents of the cause register within the cause register array as the microprocessor processes the interrupt notification.

DETAILED DESCRIPTION OF THE INVENTION

Figure 1:
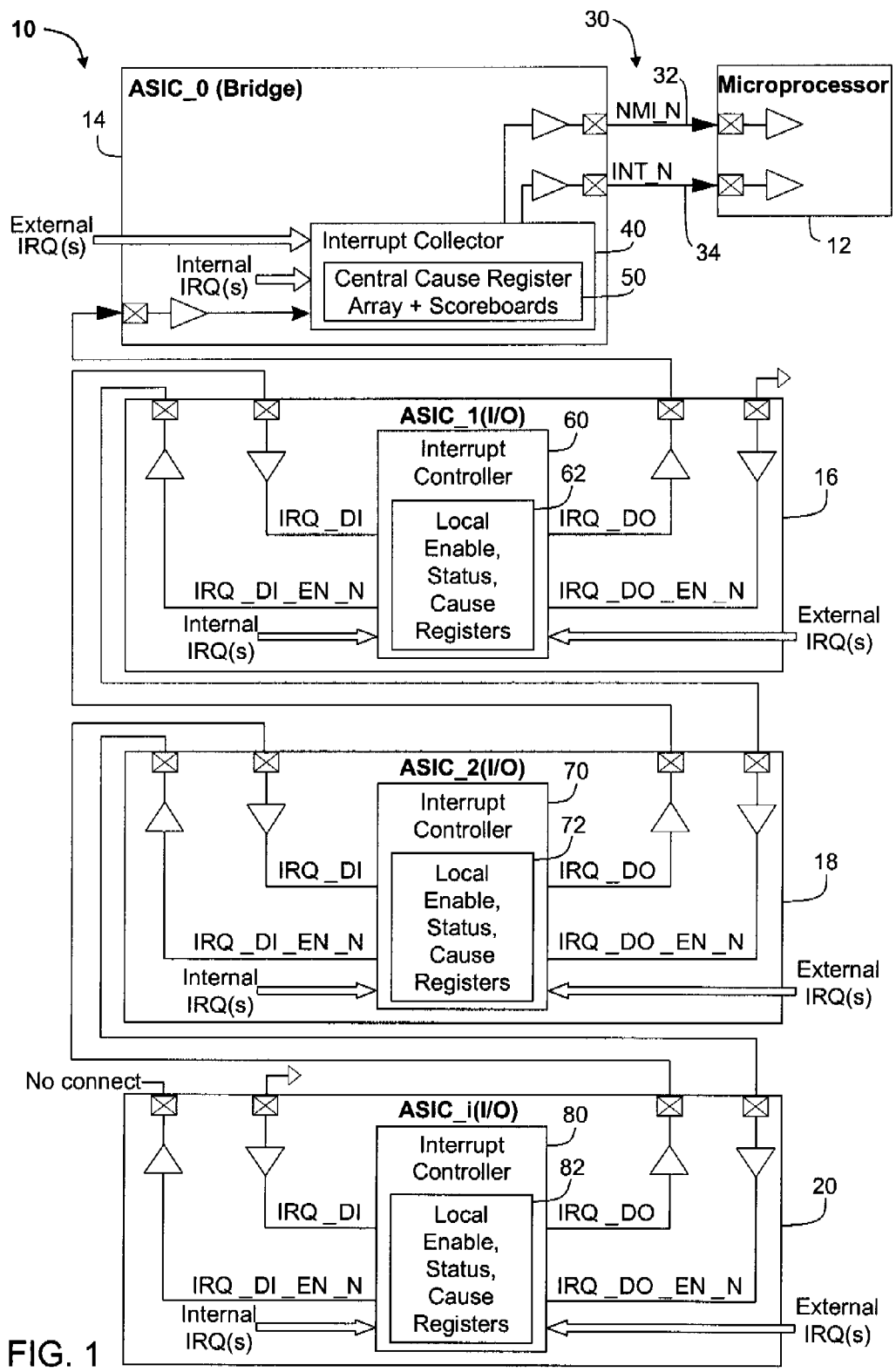
FIG. 1 is a block diagram illustrating an interrupt scheme utilized with a plurality of ASICs and a microprocessor.

FIG. 1 is a block diagram of a microprocessor based circuit 10 that illustrates an interrupt scheme utilized with a plurality of Application Specific Integrated Circuits (ASICS) and a microprocessor according to one embodiment of the present invention. As illustrated circuit 10 includes a microprocessor 12, a bridge ASIC 14, which is also denoted as ASIC_0, and a plurality of input/output (I/O) ASICs 16, 18, and 20, which are also respectively denoted as ASIC_1, ASIC_2, and ASIC_i, which is indicative that there can be as few as one I/O ASIC up to and including many I/O ASICs.

As mentioned above, microprocessor based circuit 10 includes bridge ASIC 14 (ASIC_0) which further includes a single interrupt interface 30 (including signals 32 and 34) with microprocessor 12. Additionally, bridge ASIC 14 includes an interrupt collector module 40 from which interrupt signals 32 and 34 originate. With respect to the operation of circuit 10, the interrupt collector module 40 is responsible for asserting the interrupt signals 32 and 34 to microprocessor 12. Interrupt collector module 40 also includes a central cause register array 50 which, in one embodiment, is an N deep register file that is configured to store interrupt cause values for all ASICs, for example, bridge ASIC 14 and ASICs 16, 18, and 20, in the circuit 10.

More specifically, ASICs 16, 18, and 20 (ASIC_1, ASIC_2, and ASIC_i) are input/output ASICs that perform other processing functions within a system that also generates interrupts. Each of ASICs 16, 18, and 20 contains an interrupt controller module, respectively 60, 70, and 80. Each interrupt controller module is responsible for collecting internal and external interrupt pulses and organizing them into interrupt cause registers 62, 72, and 82 respectively. In one embodiment, the various interrupt cause registers 62, 72, and 82 are prioritized to support multiple levels of interrupt priority. In the embodiment and as illustrated, the interrupt controller modules 60, 70, and 80 are connected to each other in a serial, daisy chain configuration.

When an interrupt cause register captures an interrupt pulse, for example, interrupt cause register 72, a command is transferred over the serial interface, through the interrupt controllers of any intervening ASICs, ASIC 16 in the example of FIG. 1, to the central cause register array 50 of interrupt collector 40 within bridge ASIC 14. Each interrupt controller 60, 70, and 80 performs an arbitration function to select whether to pass a downstream serial interrupt command or an internal interrupt cause value.

In one embodiment, the serial interrupt command contains an ASIC identifier (ASIC_ID) field, a cause register identifier (CAUSE_REG_ID) field, and a cause value field. In one particular embodiment, the cause value field width is 32 bits. The ASIC_ID field and CAUSE_REG_ID field are utilized as an index into the central cause array 50 of interrupt controller 40 when storing cause values. The cause value field in the serial interrupt command is logically OR'ed with an existing central cause array value field allowing new pending interrupts to be posted alongside existing pending interrupts.

After the ASIC_ID and CAUSE_REG_ID fields are received within interrupt collector 40, an early interrupt detection function is set within the interrupt collector 40 to assert either the general interrupt signal 34 (INT_N) or the non-maskable interrupt signal 32 (NMI_N) to microprocessor 12. While microprocessor 12 is performing a context switch (recognizing an interrupt level, pushing registers onto a stack, fetching interrupt vectors, etc . . . ), the cause value field is shifted into the central cause array 50 of the interrupt collector 40 and stored therein. The early interrupt detection function allows the shifting of the cause value to occur simultaneously with the microprocessor context switch thereby hiding the latency necessary to transfer the cause value. The only hardware latency is associated with the shifting of the ASIC_ID and CAUSE_REG_ID fields.

System 10 operates as an interrupt interconnection network that consists of a serial daisy chain in which interrupt cause values are serially transferred from the device (e.g., an interrupt controller) detecting the interrupt event to the interrupt collector 40 within bridge ASIC 14 through each adjacent device in the serial daisy chain. The number of interrupt controllers through which the interrupt cause value must transfer through is dependent of the location of the interrupting device on the serial interrupt interconnection network. Serial transfer of the interrupt cause values through an intermediate interrupt controller has a minimal latency, for example, two to three clock cycles. In specific embodiments, the interrupt controllers configured to receive higher priority interrupts are located closest to the interrupt collector 14 on the serial daisy chain network and the interrupt controllers configured to receive lower priority interrupts are located farthest from the bridge device 14 that includes the interrupt collector 40.

The serial interrupt interconnection network of system 10 is an out-of-band bus relative to the normal operational data buses used by the microprocessors which are considered in-band. The benefit of using the "out-of-band" bus for transfer of interrupt signals means that there is no contention or dependencies related to the sharing of a data bus with the microprocessor 12, which is typically fetching instructions, reading/writing data to/from memory or other input/output (I/O) devices. With respect to in-band devices, when multiple bus masters are present and arbitration between bus masters is required, access to a shared bus can become a bottleneck. Furthermore, an access to a slow responding device may be initiated just as a critical interrupt event occurs causing an extended delay for the interrupt to be processed. An illegal address generated on a shared system (in-band) bus can cause unbounded system delays. The serial out-of band interconnection for interrupt servicing provided by system 10 alleviates such issues. In addition, the configuration of system 10 provides an ability to scale to support a significant amount of interrupt events as further described below.

Each interrupt cause register within the interrupt controllers of system 10 can be configured as either an exception level register or an indication level register. An exception level is considered to be a higher priority type of interrupt and is indicative of an error event within the system. An indication level is considered a normal priority interrupt and is indicative of, for example, the normal completion of an event. In one example embodiment, an exception level interrupt asserts the non-maskable interrupt signal 32 of microprocessor 12, while an indication level interrupt asserts the general purpose interrupt signal 34 of microprocessor 12. In a particular embodiment, interrupt collector 40 maintains separate scoreboards for pending exception level interrupts and pending indication level interrupts.

In one operating example of the architecture of system 10, six ASICs including a bridge ASIC 14, where each ASIC includes five 32 bit wide cause registers to provide system support for 960 possible interrupt sources. It is contemplated to be extendable beyond this implementation. In the operating example, all interrupts are available within two read cycles. By keeping interrupt collector 40 within bridge ASIC 14, the two read cycles can occur at a very high clock rate. The high clock rate is possible since bridge ASIC 14 is attached to microprocessor 12 and normally operates at a clock rate of the microprocessor bus, keeping the latency low for the two read cycles.

The described interrupt collection scheme collects all pending interrupts from multiple ASICs within a system into a central cause register array 50 (shown in FIG. 1). The central cause register array 50 is located inside an interrupt collector module 40 that is located inside a bridge ASIC 14 that is directly connected to a microprocessor 12 via a non-maskable interrupt signal 32 and a general interrupt signal 34.

The central cause register array 50 is large enough to store all possible interrupts, based on the number of ASICs serially connected to bridge ASIC 14 and a number of cause values supported within each of the ASICs. The interrupt collector module 40 within bridge ASIC 14 includes a scoreboard mechanism that enables the program being executed by microprocessor 12 to uniquely determine which interrupt is pending within the entire central cause register array 50 in two register read cycles. A software interrupt handler routine running on microprocessor 12 initiates a first read to a scoreboard which indicates which cause register within the central cause array 50 of the interrupt collector 40 is the source of the interrupt. The second read step is to the cause register itself to determine the specific interrupt event.

An early interrupt detection mechanism in the interrupt collector 40 asserts the interrupt signal to the microprocessor 12 as soon as the source is known. The early interrupt indication feature is used to temporarily set an appropriate scoreboard register bit and assert the appropriate microprocessor interrupt signal (non-maskable interrupt or general purpose interrupt) as soon as a valid interrupt source has been recognized. In one implementation, the early indication occurs after a three bit ASIC identifier, a three bit cause register ID, and a one bit parity field is received. The serial shift of the 32 bit cause register occurs in parallel with the microprocessor context swap time. During this time, the microprocessor branches from traditional instruction processing to interrupt instruction processing thereby calling an operating system level interrupt service routine. The interrupt service routine performs the two step read operation described above.

Interrupts are moved from the other ASIC's interrupt controllers (illustrated as 60, 70, and 80 in FIG. 1) to interrupt collector 40 using a low pin-out daisy chain serial interface. The serial command contains fields to uniquely identify a central cause array index to be used when storing the interrupt cause value. The architecture of system 10 provides an ability to transfer up to 32 unique interrupt events in one serial transfer. Events are accumulated from remote devices while interrupt cause registers wait to be serially transmitted.

Figure 2:
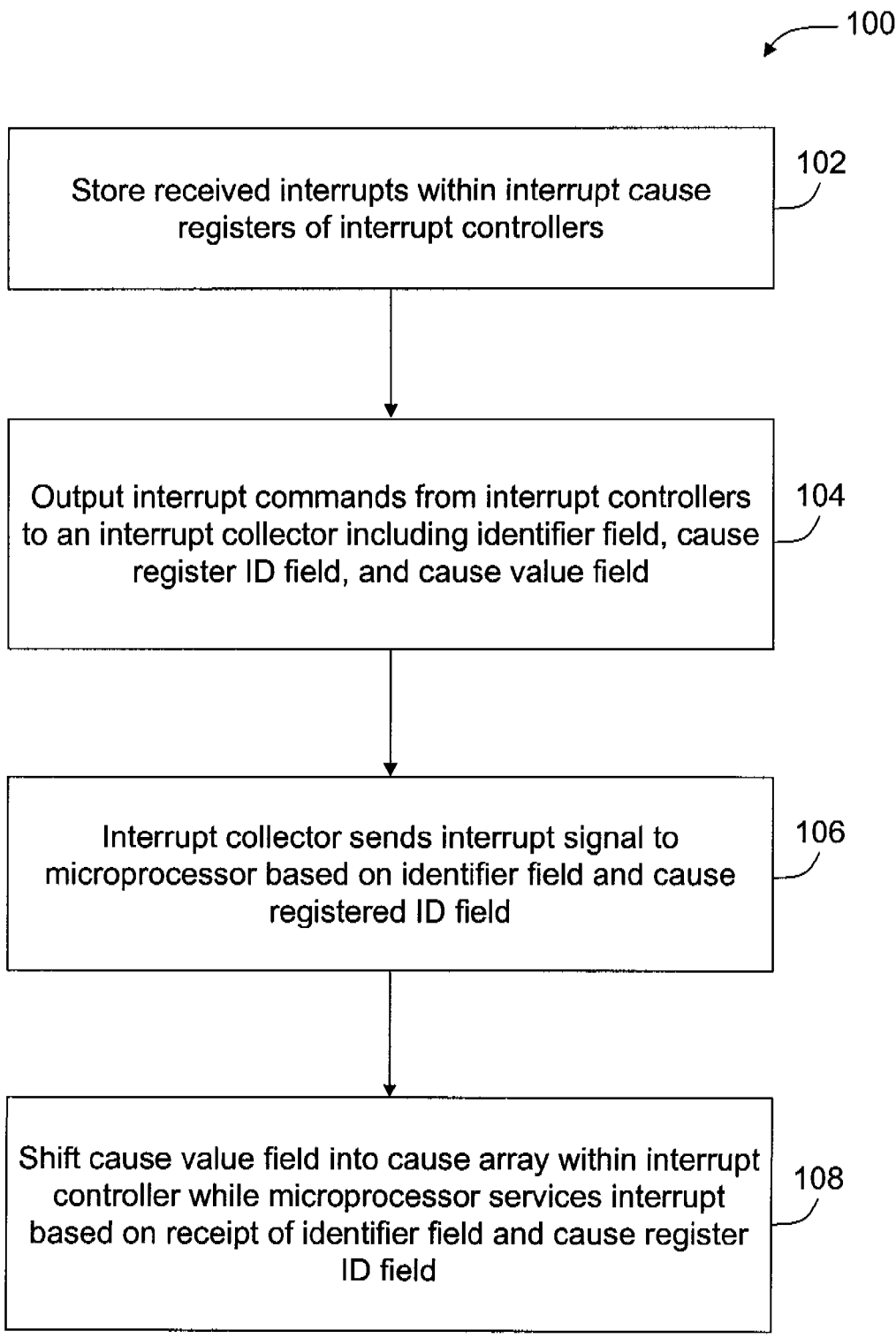
FIG. 2 is a flowchart illustrating a method of interrupt servicing performed by the system of FIG. 1.

FIG. 2 is a flowchart 100 which illustrates one method of interrupt servicing performed by system 10 (shown in FIG. 1). More specifically, flow chart 100 illustrates a method for processing an interrupt signal within a microprocessor based system. The method includes storing 102 a received interrupt signal within an interrupt cause register of an interrupt controller. An interrupt command is then output 104 from the interrupt controller to an interrupt collector. The interrupt command includes an identifier field, a cause register ID field, and a cause value field. A content of the cause value field is based on a content of the interrupt cause register. An interrupt signal is asserted 106 by the interrupt collector to the microprocessor, based on receipt of the identifier field and cause register ID field by the interrupt collector. The cause value field is shifted 108 into a cause array within the interrupt collector while the microprocessor services the receipt of the identifier field and cause register ID field from the interrupt collector.

The approach the handling of interrupts described herein reduces the total time for hardware interrupt signal latency in combination with the software interrupt handler response time using a combination of hardware architecture and interrupt source score-boarding. In this approach, each potential interrupt source can be uniquely distinguished by the software interrupt handler routine running on a microprocessor with a simple two step register read. The first read is to a central cause scoreboard which tells the software interrupt handler routine which interrupt register located in the central cause register array has a pending interrupt. The second read is to the specific central cause register containing the pending interrupt. Each interrupt source is configured to generate pulse based interrupts and all interrupt sources are separated and assigned to a unique bit position within an interrupt cause register. The described interrupt approach minimizes I/O pin usage, and provides scalability to easily grow of the number of interrupt sources supported.

While the invention has been described in terms of various specific embodiments, those skilled in the art will recognize that the invention can be practiced with modification within the spirit and scope of the claims.

What is claimed is:

1. A method for processing an interrupt signal within a microprocessor based system, said method comprising:
    storing a received interrupt signal within an interrupt cause register of an interrupt controller;
    outputting an interrupt command from the interrupt controller to an interrupt collector, the interrupt command including an identifier field, a cause register ID field, and a cause value field, a content of the cause value field based on a content of the interrupt cause register;
    asserting an interrupt signal to the microprocessor from the interrupt collector, based on receipt of the identifier field and cause register ID field by the interrupt collector; and
    while the interrupt signal is asserted to the microprocessor, shifting the cause value field into a cause array within the interrupt collector such that the shifting occurs while the microprocessor services the receipt of the identifier field and cause register ID field from the interrupt collector.

2. A method according to claim 1 wherein outputting an interrupt command from the interrupt controller to an interrupt collector comprises transferring the interrupt command through a plurality of serially connected interrupt controllers.

3. A method according to claim 1 further comprising prioritizing multiple interrupt cause registers to support multiple levels of interrupt priority.

4. A method according to claim 1 further comprising determining, within the interrupt collector, if the cause value field includes new interrupts.

5. A method according to claim 4 wherein determining if the cause value field includes new interrupts comprises logically comparing the cause value field with an existing central cause array value field stored in the interrupt collector.

6. A method according to claim 5 wherein the logical comparing comprises allowing new interrupt cause values to be added to existing interrupt cause values by logically ORing the cause value field and the central cause array value field.

7. A method according to claim 1 further comprising performing an arbitration function within the interrupt controller to determine whether to output a serial interrupt command originating from a serially connected interrupt controller or an internally generated interrupt cause value.

8. A method according to claim 1 wherein asserting an interrupt signal to the microprocessor from the interrupt collector comprises asserting at least one of a general interrupt signal and a non-maskable interrupt signal.

9. The method according to claim 1 wherein the cause value field shifting occurs simultaneously with a microprocessor context switch occurring in response to the asserted interrupt signal.

10. A system architecture for processing of interrupts, said system architecture comprising:
    a microprocessor comprising at least one interrupt input pin and at least one bus;
    a bridge device configured to comprise an interrupt collector and a cause register array, said bridge device coupled to said at least one interrupt pin and said at least one bus; and
    at least one processing device configured to comprise an interrupt controller module and a cause register, said interrupt controller module serially connected to said interrupt collector and configured to receive interrupt signals, organize the signals within said cause register, and transfer contents of said cause register to said interrupt collector, said interrupt collector configured to simultaneously notify said microprocessor of an interrupt and shift the received contents of said cause register within said cause register array such that said microprocessor processes the interrupt notification while the cause register shifting occurs.

11. A system architecture according to claim 10 comprising a plurality of said processing devices each comprising one of said interrupt controllers, said interrupt controllers coupled to one another in a serial, daisy chain configuration.

12. A system architecture according to claim 11, said processing devices configured such that contents of said cause registers are transferred through said interrupt controllers of intervening said processing devices to said interrupt collector.

13. A system architecture according to claim 11, each said processing device configured to perform an arbitration function to determine whether to pass a interrupt command, including a cause value from another said processing device, or transmit an internal cause value.

14. A system architecture according to claim 10 wherein said cause registers are prioritized to support multiple levels of interrupt priority.

15. A system architecture according to claim 10 wherein said cause register array comprises a register file capable of storing interrupt cause values for all of said processing devices within said system architecture.

16. A system architecture according to claim 10 wherein at least one of said at least one processing device and said bridge device comprises at least one ASIC or one FPGA.

17. A system architecture according to claim 10 wherein said interrupt collector is configured to output at least one interrupt signal to said microprocessor.

18. A system architecture according to claim 10 comprising:
    while the interrupt notification is asserted to the microprocessor, setting an appropriate scoreboard register bit during a current read cycle such that the microprocessor determines which interrupt is pending at the next read cycle based upon the set scoreboard register bit.

19. A system architecture according to claim 10, further comprising:
    a first scoreboard with a plurality of first register bits corresponding to an exception level interrupt, wherein one of the first register bits is set during a current read cycle such that the microprocessor determines which exception level interrupt is pending at the next read cycle based upon the set first scoreboard register bit; and a second scoreboard with a plurality of second register bits corresponding to an indication level interrupt, wherein one of the second register bits is set during the current read cycle such that the microprocessor determines which indication level interrupt is pending at the next read cycle based upon the set second scoreboard register bit.

* * * * *